United States Patent
Leppänen et al.

(10) Patent No.: US 11,069,137 B2
(45) Date of Patent: Jul. 20, 2021

(54) RENDERING CAPTIONS FOR MEDIA CONTENT

(71) Applicant: Nokia Technologies Oy, Espoo (FI)

(72) Inventors: Jussi Leppänen, Tampere (FI); Sujeet Mate, Tampere (FI); Arto Lehtiniemi, Lempaala (FI); Antti Eronen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/832,640

(22) Filed: Mar. 27, 2020

(65) Prior Publication Data

US 2020/0312025 A1 Oct. 1, 2020

(30) Foreign Application Priority Data

Apr. 1, 2019 (EP) .................................... 19166620

(51) Int. Cl.
*G06T 19/00* (2011.01)
(52) U.S. Cl.
CPC .................... *G06T 19/00* (2013.01)
(58) Field of Classification Search
None
See application file for complete search history.

(56) References Cited

U.S. PATENT DOCUMENTS

| 2013/0044128 | A1  | 2/2013 | Liu et al. |
| 2014/0111542 | A1* | 4/2014 | Wan .................... G06K 9/3258 345/633 |
| 2015/0206348 | A1* | 7/2015 | Koreeda ............ H04N 21/4725 345/633 |
| 2018/0204386 | A1  | 7/2018 | Chen et al. |

FOREIGN PATENT DOCUMENTS

| WO | 2016/048633 A1 | 3/2016 |
| WO | 2018/182321 A1 | 10/2018 |

OTHER PUBLICATIONS

Savioja et al., "Creating Interactive Virtual Acoustic Environments", Journal of the Audio Engineering Society. Audio Engineering Society, vol. 47, No. 9, Sep. 1999, pp. 675-705.
United Kingdom Provisional Application No. 1904091.4, "Associated Spatial Audio Playback", filed on Mar. 25, 2019, 40 pages.
Extended European Search Report received for corresponding European Patent Application No. 19166620.5, dated Sep. 11, 2019, 9 pages.

\* cited by examiner

*Primary Examiner* — Robert J Craddock
(74) *Attorney, Agent, or Firm* — Alston & Bird LLP

(57) ABSTRACT

An apparatus comprising means for rendering virtual reality content, wherein the virtual reality content comprises a virtual reality object associated with a caption and wherein the caption is rendered within a field of view of a user; determining a level of interest with respect to the virtual reality object; and determining if the caption is to be rendered based at least partly on the determined level of interest associated with the virtual reality object.

17 Claims, 9 Drawing Sheets

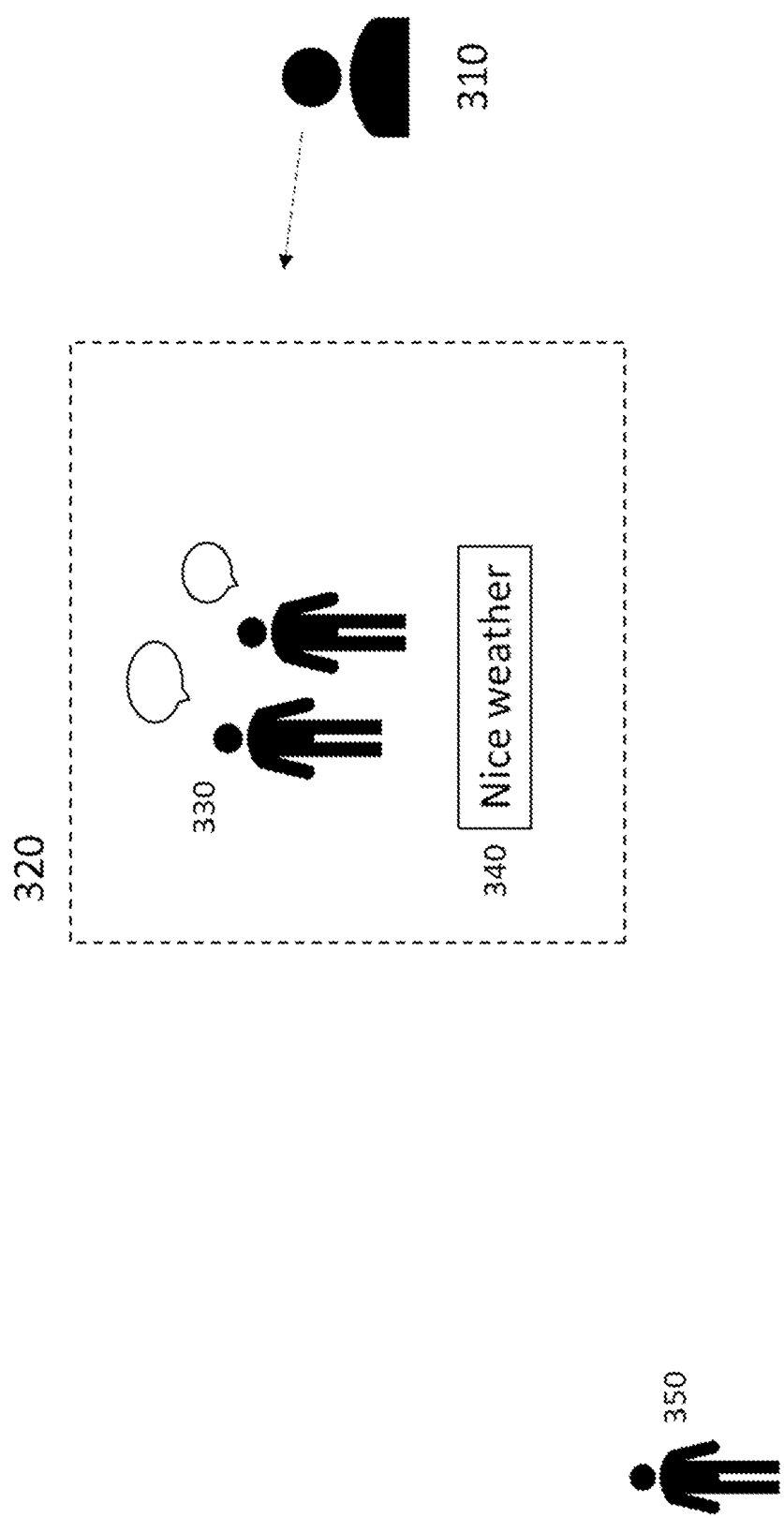

RENDERING CAPTIONS FOR MEDIA CONTENT

FIELD

The present application relates to rendering of computer-generated content.

BACKGROUND

Rendering computer-generated content may be utilized in creating desirable user experience. The computer-generated content may include visual content as well as audio and/or haptic content. Various devices are capable of rendering computer-generated content and the content may have been captured using cameras and microphones or it may be computer-generated or a combination of both.

BRIEF DESCRIPTION

According to an aspect there is provided an apparatus comprising means for
rendering virtual reality content, wherein the virtual reality content comprises a virtual reality object associated with a caption and wherein the caption is rendered within a field of view of a user; determining a level of interest with respect to the virtual reality object; and determining if the caption is to be rendered based at least partly on the determined level of interest associated with the virtual reality object.

According to another aspect there is provided an apparatus comprising at least one processor, and at least one memory including a computer program code, wherein the at least one memory and the computer program code are configured, with the at least one processor, to cause the apparatus to render virtual reality content, wherein the virtual reality content comprises a virtual reality object associated with a caption and wherein the caption is rendered within a field of view of a user; determine a level of interest with respect to the virtual reality object; and determine if the caption is to be rendered based at least partly on the determined level of interest associated with the virtual reality object.

According to another aspect there is provided a method comprising rendering virtual reality content, wherein the virtual reality content comprises a virtual reality object associated with a caption and wherein the caption is rendered within a field of view of a user; determining a level of interest with respect to the virtual reality object; and determining if the caption is to be rendered based at least partly on the determined level of interest associated with the virtual reality object.

According to another aspect there is provided a computer program product which when executed by a computing apparatus causes the apparatus to perform rendering virtual reality content, wherein the virtual reality content comprises a virtual reality object associated with a caption and wherein the caption is rendered within a field of view of a user; determining a level of interest with respect to the virtual reality object; determining if the caption is to be rendered after based at least partly on the determined level of interest associated with the virtual reality object.

According to another aspect there is provided a computer program product comprising computer program code stored in a non-transitory memory medium, the computer program code being configured to cause an apparatus, when executing the program code by a processor circuitry, to perform at least the following: rendering virtual reality content, wherein the virtual reality content comprises a virtual reality object associated with a caption and wherein the caption is rendered within a field of view of a user; determining a level of interest with respect to the virtual reality object; determining if the caption is to be rendered after based at least partly on the determined level of interest associated with the virtual reality object.

BRIEF DESCRIPTION OF THE DRAWINGS

FIGS. 3a-3d illustrate an example embodiment of rendering captions.

DETAILED DESCRIPTION

Figure 1:
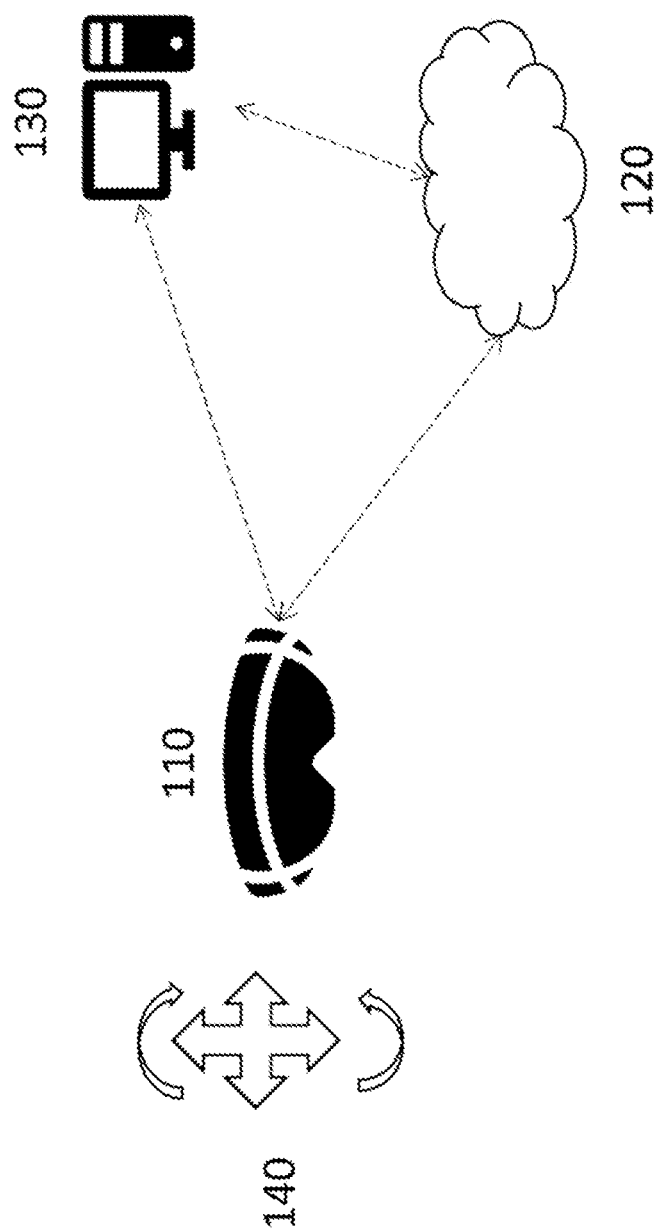
FIG. 1 illustrates an example embodiment of an apparatus for rendering virtual reality content.

Creating user experience comprises rendering content such as visual content and/or audio content. In some example embodiments, the user experience may be enhanced by utilizing haptic feedback as well.

Augmented reality provides an enhance user experience by enhancing a physical environment with computer-generated content. The computer-generated content may comprise visual content, audio content and/or haptic feedback provided to the user. Yet, the user may still sense the surrounding physical environment and thereby is not fully immersed into the augmented reality content.

Mixed reality provides a user experience similar to augmented reality, but in mixed reality the added computer-generated content may be anchored to the real-world content and may be perceived to interact with real-world objects. For the purpose of easier explanation an umbrella-term virtual reality is used form hereon and the term is to cover augmented reality, mixed reality and virtual reality.

Virtual reality provides immersive user experience by rendering visual content that fills the user's field of view. The user experience may further be enhanced by rendering audio content as well. The virtual reality content can therefore be considered as multimedia content. Virtual reality content may therefore enable a user to experience an interactive computer-generated environment. The computer-generated environment may be based on captures of a real physical environment or it may be a created one. The captures of the real physical environments may have been obtained using one or more cameras and/or one or microphones for example. In some example embodiments, captures form the real physical environment may be enhanced with computer-generated objects. Virtual reality content may extend beyond user's field of view and therefore the user may be able to perceive only a portion of the content at a given moment. In virtual reality, the user is enabled to explore the content by having the virtual reality content transition from rendering one part of the content to rendering another part of the content which may or may not overlap with the content that was previously rendered. This may be perceived by the user as if the user just moved a certain distance within the virtual reality content and therefore the movement may be considered as moving a certain virtual distance. The virtual reality content as a whole may form a virtual reality scene. It is to be noted that the user may also be rendered audio and that the virtual reality content may comprise audio that is not perceived by a user at a given moment as the virtual distance between the audio and the content the user currently perceives may be more than a threshold virtual distance and therefore rendering the audio would disturb the current user experience. A field of perception may therefore be considered as the content that the user perceives at a given moment and it may include visual content within the field of view of the user and audio perceivable to the user at the same given moment.

As it was mentioned above, the user may be able to explore the rendered virtual reality content. In some example embodiments the exploration may be achieved by means of user input such as the user providing gestures, using a mouse to interact or providing touch inputs, to indicate how the content is to be explored. In some other example embodiments, movement of the user may correspond to the exploration of the virtual reality content. Movements of the user may be divided into two categories: rotational and translational movement. Rotational movement that comprises pitch, yaw and roll, may correspond to the movement of the user's head. Rotational movement therefore can be interpreted such that the rendered virtual reality content is experienced from a static point or along an automatically moving trajectory. Rotational movement may be detected for example when the user moves his or her head.

Translational movement on the other hand corresponds to the user moving along x, y and z-axis according to his/her wishes thereby allowing the user to change the position of rendering for the virtual reality content. If the user may move freely in terms of both rotational and translational movement, the virtual reality experience may be considered as free-viewpoint experience. The movement of a user the virtual reality content supports may be defined as various degrees of movement. For example, 3 degrees of freedom, 3 DoF, describes virtual reality content in which the user may support rotational movement but not translational movement. 6 degrees of freedom, 6 DoF, on the other hand may support both rotational and translational movement and so called 3 DoF+ may support movement that is more than in 3 DoF but less than in 6 DoF.

To create a virtual reality user experience, virtual reality content is to be rendered such that the user experience is immersive. The content may be rendered using for example a headset and headphones which may be combined in one device or may be separate devices. Further, special gloves or hand-sets, omnidirectional treadmills may be used to create the user experience. The virtual reality content should be rendered in such a manner that output for visual audio and/or haptic content is synchronized. This allows the user to experience the virtual reality content in an immersive manner. If for example the audio and the visual content are not synchronized, the immersive user experience may suffer.

Virtual reality content and the immersive user experience it enables may be utilized in various fields. For example, entertainment field may utilize virtual reality in gaming, in cinema and in theme parks to enhance a roller coaster ride for example. In the field of robotics, virtual reality may be utilized to control robotic systems. As virtual reality allows for re-creating an environment in an immersive manner, it helps in training personnel in field such as military, aviation and medicine. Also, the ability to re-create identical immersive environments allows studies to be conducted in a reproducible manner in the field of psychology for example.

In some example embodiments, the virtual reality user experience may be enhanced by utilizing artificial intelligence. For example, artificial intelligence may enable a computing device to better understand what is captured in an input received from a camera that is located in the same physical environment as the user which enables the computing device to render the virtual reality content in a manner that is more suitable to the environment the user is in. For example, if the virtual reality content rendered may be explored by the user by walking around in a physical environment and the virtual reality content is rendered to the user using a headset that blocks the user's view to the physical environment the user is in, then the ability to recognize walls, furniture and other physical objects in the physical environment using artificial intelligence may help to render the virtual reality content in a manner that helps the user to avoid colliding into the physical objects. Additionally, or alternatively, artificial intelligence may learn the user's behaviour and utilize that information when rendering the virtual content.

FIG. 1 illustrates an example embodiment in which an apparatus that is in this example embodiment a headset 110 is used to render virtual reality content. The headset, which may also be called a head-mounted display, provides a display for rendering visual content in front of the user's eyes. In some example embodiments, the visual content may be rendered using digital screens for displaying stereoscopic video images in front of the user's eyes thereby enabling the user to experience the video content as three-dimensional. The headset 110 may be a stand-alone headset that is able to render content and connect to a network 120 such as the Internet without having a connection to another computer device. Alternatively, or additionally, the headset may be such that it is connected to another device such as a computer 130. The computer 130 may in such example embodiments provide updates to the headset 110 and also provide content for rendering and detect user movement based on input received from one or more sensors. The computer 130 may further be connected to the network 120 as well thereby providing that connection to be utilized by the headset 110 as well. Alternatively, the headset 110 may be a stand-alone device that does not have network connectivity such as connectivity to the Internet.

The headset 110 may further comprise, or be connected to, components that are configured to detect movement 140 of the user. For example, the headset 110 may detect 6 DoF movement that includes, yaw, pitch and roll. This may be achieved using for example a gyroscope and an accelerometer. The headset 110 may further comprise or be connected to devices such as one or more cameras and a GPS locator to detect if the user changes his location in the physical environment. The one or more cameras may also be used to detect if the user moves his head and/or limbs or moves in some other way. These movements may then be interpreted as user inputs.

The headset 110 may further comprise or be connected to a microphone that detects the user's speech and/or noises from the physical environment. The microphone therefore may allow speech recognition to be used as a way of user interaction and it may also recognize other noises coming from the physical environment. The headset 110 may further comprise gaze tracking to understand what the user is looking at. The headset 110 may yet further be connected to devices that may be hand-held and which detect movement of the user's hands. The hand-held devices may further comprise other input means such as buttons and/or touch recognition. The hand-held devices may further provide haptic feedback to the user by vibrating for example.

Audio input helps to create the immersive user experience. Therefore, the headset 110 may also comprise or be connected to audio output. The audio output may be a in form of headphones or one or more loudspeakers that are located in the physical environment. In some example embodiments, the headphones render audio content such that a dedicated rendering is done to the left and to the right ear of the user.

Although a headset 110 is illustrated in FIG. 1, in some example embodiment embodiments the virtual reality content may be rendered without a headset. For example, a room with multiple large screens and multiple loudspeakers may be designed to facilitate an immersive virtual reality user experience.

In general, in order to provide a 6 DoF user experience of virtual reality content, the spatial position of a user and/or orientation of the user's head is to be determined. This determination may in some example embodiments be achieved by tracing the spatial position and/or orientation of a headset or another apparatus that the user is holding or wearing. In some alternative example embodiments, external sensors may be used for determining the spatial position and/or orientation of the user's head. Such external sensors may comprise infrared signals that form a 3D point cloud that can then be used for recognizing a user. The movement may be measured at various time intervals and the spatial location and/or orientation may be determined based on the measurements and results may be stored. In some example embodiments, a headset comprises the following sensors: a gyroscope, an accelerometer and structured light systems. These sensors are used to generate position data from which a current field-of-view, which may correspond to the field of view of the user, is determined. As the user moves, the headset worn by the user moves as well. A detected change is the spatial position and/or orientation may then be reflected to rendering of the virtual reality content. Visual virtual reality content may be rendered such that a change corresponding to the movement of the user is visible to the user thereby allowing the user to explore the virtual reality content from different viewpoints just like the user could do in the real environment.

The determined movement of the user may also be reflected on the rendered audio. For example, some audio virtual reality content may now be rendered as coming from closer or further away and/or from different angle. To correspond to the movement of the user, modifications like level or gain and position changes are done to audio playback properties of the audio objects of the virtual reality content. For example, as the user rotates his head, the positions from where the audio of virtual reality objects comprised in the rendered virtual reality content are perceived to originate from are rotated to reflect the rotation of the user's head in a manner that would correspond to the changes that would happen in a real-world environment. In other words, the user experience is such that the perception of the user is that the virtual reality objects remain at constant positions. For example, as the user beings to walk virtual reality objects that are in the user's field of perception are perceived to remain at their locations. Therefore, the user may perceive the virtual reality objects to appear either from further away or closer, depending on if the user walks towards the objects of away from them. This causes audio of the virtual reality objects to have their gain or amplitude lowered or heightened depending on the virtual distance corresponding to the movement of the user. The example embodiments above describe rendering that may be used for implementing the 6 DoF rendering of audio objects in Moving Pictures Expert Group, MPEG-I Audio, for example.

In some example embodiments, audio of virtual reality content may be rendered as Higher Order Ambisonics, HOA, and/or containing only ambiance with no or substantially no directional sounds. In such an example embodiment the movement of the user does not have an effect on the way the audio is rendered to the user. Yet in some example embodiments, rotation of the user's head may cause corresponding rotation to be made to the rendering of the audio. In some example embodiments, the audio of virtual reality content may be in parametric spatial audio format. In such example embodiments, the rendering requires modifications to properties of time-frequency tiles, such as direction-of-arrival and amplitude. These modifications enable rendering of parametric spatial audio comprising transport signals and parametric spatial metadata for time-frequency tiles. The metadata represents then for example the directions of arrival, ratio parameter and the distance such that geometric modifications required by 6 DoF rendering may be calculated.

Figure 2:
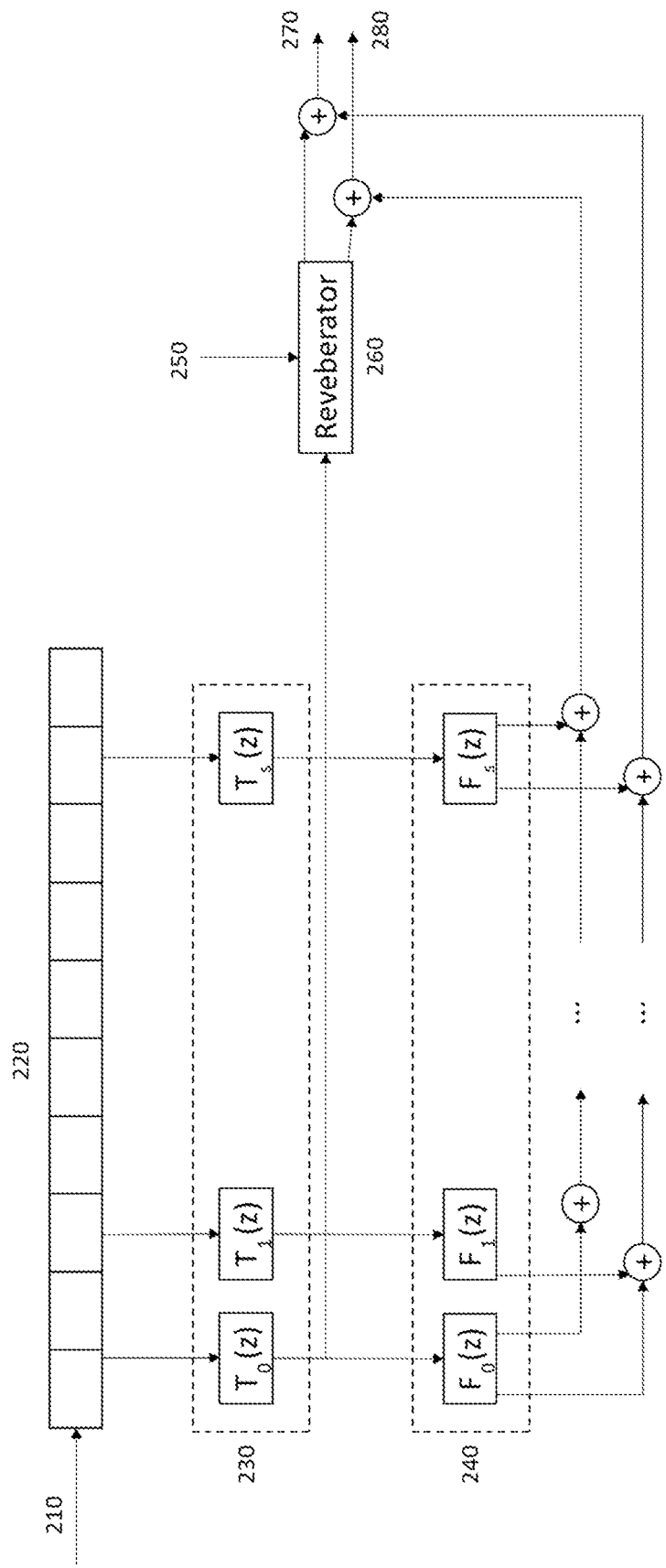
FIG. 2 illustrates an example of providing audio content.

FIG. 2 illustrates an example embodiment of rendering 6 DoF audio content as part of the virtual reality content. 6 DoF audio may be rendered binaurally using headphones or loudspeakers. In the example embodiment illustrated in FIG. 2 headphones are used. When rendering 6 DoF audio, aspects such as distance-to-gain attenuation as well as room reverberation and reflections may be taken into account to create as realistic user experience as possible. In the example embodiment of FIG. 2, synthesizing a binaural output of audio virtual reality content is illustrated. An input signal 210 is first fed to a delay line 220 in which direct sound and directional early reflections are read at suitable delays. Delays corresponding to early reflections may be obtained by analysing time delays of early reflections from a measured or idealized room impulse response. The direct audio is then fed from the delay line 220 to a source directivity and/or distance/gain attenuation modelling filter 230. The direct audio that has now been attenuated and directionally-filtered is then fed to a reverberator 260. The attenuated and directionally filtered audio is also fed to a set of head-related-transfer-function, HRTF, filters 240 which spatially positions the direct audio to correct directions with regard to the head of the user. Processing regarding early reflections is analogous to the direct audio and they may also be subjected to level adjustment and directionality processing after which HRTF filtering is done to maintain their spatial position. Yet unlike with direct audio, they are not fed to the reverberator 260.

The reverberator 260 receives as its input the direct audio and also parameters relating to reverberation 250. One set of parameters relate to the left channel and one to the right channel. As the HRTF-filtered direct audio, early reflections and the non-HRTF-filtered reverberation are summed, a signal for the left side of the headphone 270 and a signal for the right side of the headphone 280 are produced and the audio may be rendered in a binaural manner using the headphones.

It is to be noted that the orientation of the head of the user as yaw, pitch and roll may in some example embodiments be used to update directions of the direct sound and early reflections and also sound source directionality, which may depend on the orientation of the user's head. Further, the position of the user may be used to update directions and distances to the direct audio and early reflections.

In some example embodiments, rendering audio to reflect a distance may be achieved by modifying the gain as well as direct-to-wet or direct-to-dry ratio. A dry signal is a signal that does not contain added effects while a wet signal does. For example, direct signal gain may be modified according to 1/distance causing audio to get quieter inversely proportionally to the perceived distance in the virtual reality. The direct-to-wet ratio decreases when objects are perceived to get further away from the user. In some example embodiments, wet gain may be kept constant within the listening space and then apply distance/gain attenuation to the direct audio.

In the example embodiments above, visual virtual reality content was rendered to the user such that the user did not have visibility to the physical environment the user was located in. In some example embodiments, even though visual virtual reality content is being rendered to the user, the user may still have visibility to the physical environment the user is located in. In such example embodiment the visual virtual reality content that is computer-generated is superimposed the physical environment thereby enhancing the user experience. This enhancement may be called augmented reality. Augmented reality may be utilized in various fields such as commerce, education, video games, industrial design, flight training and medical field.

An apparatus such as a headset may be utilized for rendering visual augmented reality content. The headset allows the user to see the environment around him and also projects the computer-generated content into the user's filed of view. Various technologies may be used to project the computer-generated content in to the user's field of view such as micro projectors or micro-displays that are connected to see-through lightguides. A headset that is used to rendered visual augmented reality content may comprise or be connected to headphones that may render audio in a manner explained above. The headset may alternatively be connected to loudspeakers. Further the headset may detect user's movements like was explained above. In some example embodiments, rendering visual augmented reality content may be done using an apparatus such as a mobile device. It is to be noted that the terms virtual reality content and visual virtual reality content as used hereafter may refer to augmented reality or virtual reality user experience.

If the virtual reality content allows the user to move freely, like is the case with 6 DoF virtual reality content, the user may freely move such that the virtual reality object comprised in the virtual reality content he is looking at is left out of the field of perception of the user due to the movement. It is to be noted that in some example embodiments, additionally or alternatively, an input may be received and the input is determined to represent movement of the user. Such input may be provided by a user using for example a joystick or a gesture and the input may cause a virtual representation of a user, comprised in the virtual reality content, to move according to the received input Additionally, or alternatively, the user may zoom the content thereby changing the virtual reality object that is being focused on by the user. The user may also teleport meaning that the user may change from one virtual reality content to another virtual reality content and the virtual distance between the two contents is large enough not to allow the two contents to be rendered simultaneously to the field of perception of the user. In other words, the user's perceived position within the rendered virtual reality content may be changed by the user moving, zooming, teleporting or providing other user input that indicates a change of perceived position within the rendered virtual reality content.

In some example embodiments, some of the rendered virtual reality content may comprise a virtual reality object associated with a caption that is graphical content, such as text and/or icons, related to the object. The caption may be associated with a virtual reality object comprised in visual and/or audio virtual reality content. Rendering of the caption may be determined based on the level of interest the user indicates towards a virtual reality object. If the level of interest exceeds a threshold, then the caption is rendered in some example embodiments. The level of interest may be determined based on the amount of time the user has spent looking at and/or listening to the virtual reality object. The level of interest may be determined using gaze tracking for example. Alternatively, or additionally, user may provide input indicative of his interest towards the virtual reality content. Alternatively, or additionally, artificial intelligence may be utilized to determine the likelihood that the user's level of interest is high enough and if the likelihood is above a threshold value, the caption is rendered. The content of the caption may be transmitted to the apparatus rendering the caption using metadata for example. If a caption is rendered and the location of the user changes within the virtual reality content thereby also changing the user's field of perception, then the question arises if to continue rendering the caption or not.

FIG. 3a illustrates an example embodiment in which virtual reality content is rendered to the user 310. The user's field of perception comprises the field of view 320 as well as audio related to the field of view 320 and being rendered to the user 310. The audio is spatial audio and the virtual reality content allows the user to move freely. Spatial audio may be understood as immersive rendering of audio that corresponds to the perception of audio that would occur in a physical environment comprising audio sources. In the field of view 320 there is visual virtual reality content that comprises a virtual reality object 330 comprising two people that are having a conversation. In this example embodiment, the two people are using a language the user 310 does not understand and therefore the caption 340 is rendered to the user 310. It is determined that the user 310 is interested in the conversation of the people as gaze tracking indicates the user 310 is looking at, for longer than a threshold period of time, the virtual reality object 330 comprising the two people having the conversation. Gaze tracking may be implemented, in some example embodiments, based on optical tracking of corneal reflections. For example, a headset may comprise an infrared light source that is targeted towards the eye of the user and a camera capable of capturing infrared light that is also comprised in the headset captures the reflections of the infrared light from the eye. The content of the caption 340 may be determined for example by using speech recognition and automatic translation or, in some example embodiments, the content of the caption 340 may be pre-determined. The user's field of perception does not comprise the virtual reality object 350 comprising a third person.

Figure 3B:
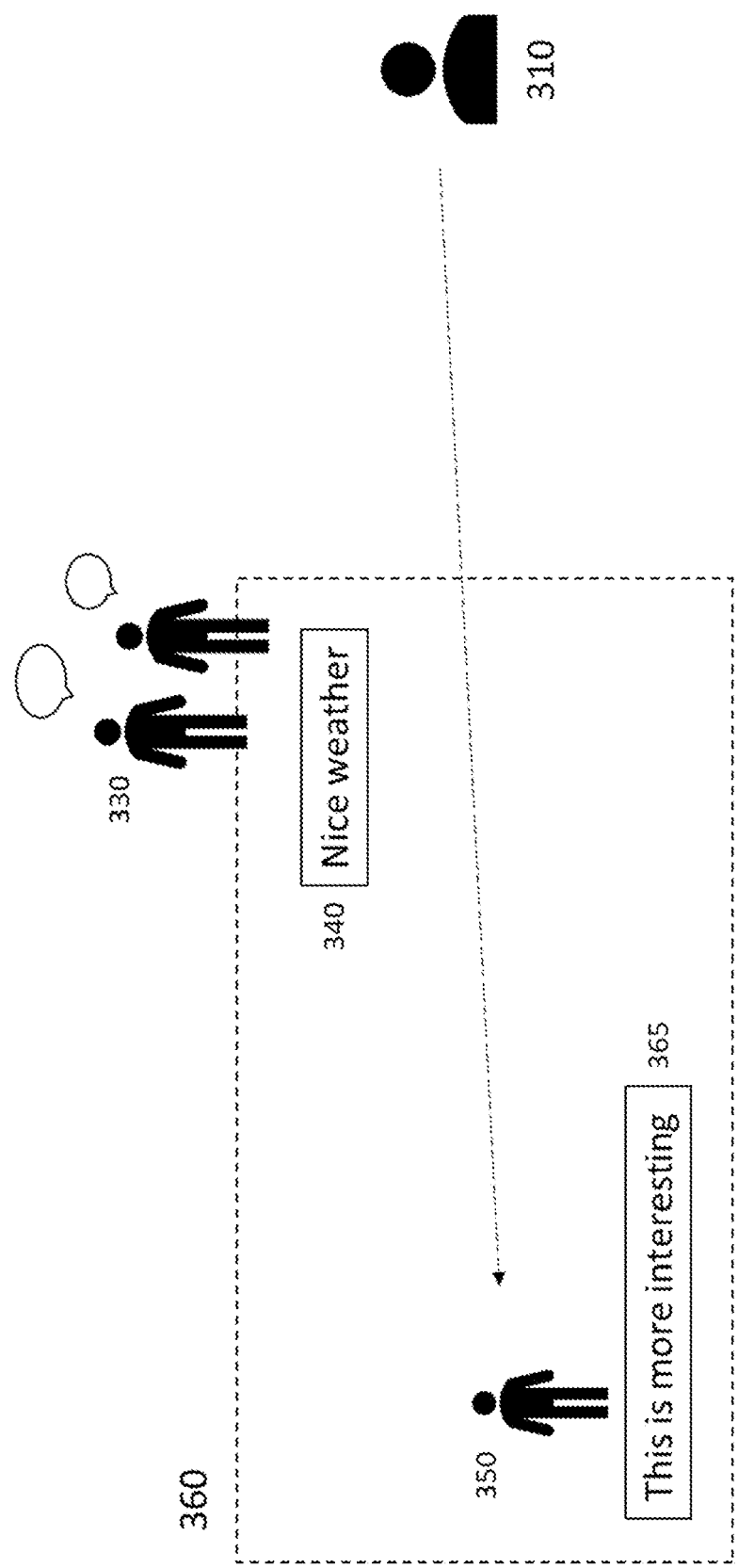

As the user 310 changes his orientation and perceived position within the virtual reality content, the virtual reality object 350 including the third person is now rendered within the user's field of perception as illustrated in FIG. 3b. The field of view 360 visible to the user 310 now contains the third person 350. The caption 365 is associated with the third person 350 but is not visible at first. When it is determined that the user 310 has a level of interest that exceeds a threshold, the caption 365 is rendered within the field of view 360. In this example embodiment the level of interest is determined based on the user 310 zooming to the virtual reality object 350 which causes audio virtual reality content associated with the virtual reality object 350 to be rendered to the user 310 as well. In some other example embodiments, other user interaction and/or determination based on for example user's previous behaviour may be used to determine the level of interest. Yet, caption 340 is also rendered even though only part of the virtual reality object 330 remains visible in the field of view 360 and the audio associated with the virtual reality object 330 is no longer therefore rendered. The caption 340 is rendered due to the detected high level of interest from the user 310. The detected high level of interest is, in this example embodiment, based on the amount of time the user 310 has spent following the conversation between the two people of the virtual reality object 330 which is observed using gaze tracking for example. In some example embodiments, the user 310 may provide user input that indicates a wish from the user 310 to remove the caption 340 after which the caption 340 is no longer rendered.

Figure 3C:
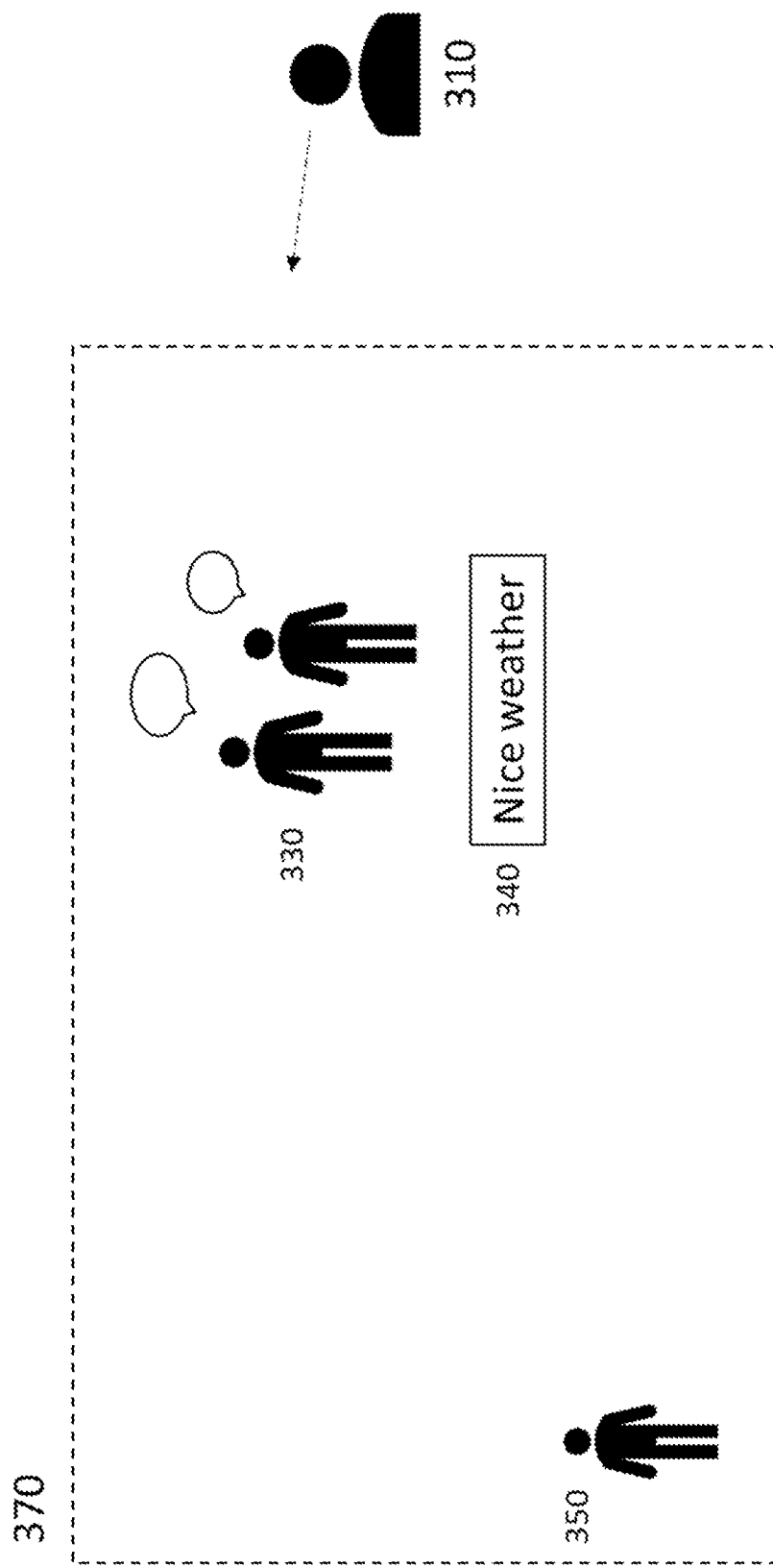

In FIG. 3c, the user 310 has zoomed out from the virtual reality object 350 illustrating the third person. Therefore, the audio virtual reality content associated with the virtual reality object 350 is no longer rendered and it is determined that the user 310 did not have an interest level high enough to continue rendering the caption 365 associated with the virtual reality object 350. Instead, the caption is still rendered within the field of view 370. Also, virtual reality objects 330 and 350 are rendered within the field of view 370 and also audio virtual reality content associated with the virtual reality object 330 may also be rendered.

Figure 3D:
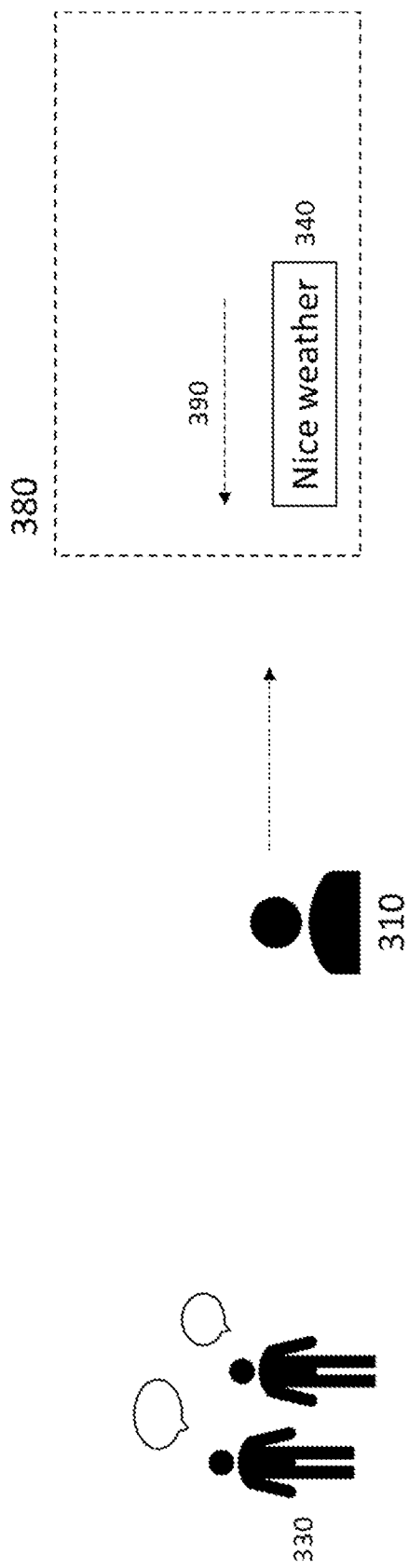

In FIG. 3d the user 310 has turned around and started to walk away from the virtual reality object 330. Therefore, the virtual reality object 330 is no longer visually rendered within the field of view 380. The audio virtual reality content relating to the virtual reality object 330 may still be rendered or in some alternative example embodiments, it is no longer rendered. It is also possible that the audio virtual reality content relating to the virtual reality object 330 is rendered such that it gives the impression of user walking away from the virtual reality object 330 and the audio virtual reality content is attenuated as the user walks further away. It is to be noted that although the user 310 in this example embodiment walks away, other user input could also be provided that is then interpreted as the user 310 moving away from the virtual reality object 330 within the virtual reality content. As the user 310 has a level of interest high enough towards the conversation illustrated by the virtual reality object 330 and the audio virtual reality content associated with it, the caption 340 is rendered within the field of view 380 even though the user 310 moves away from the conversation. In some example embodiments, an indication such as an arrow (390) may be added to the caption 340 to indicate the direction in which the conversation is ongoing. In some example embodiments, the size of the caption may also be proportional to the virtual distance the user 310 has moved away from the virtual reality object 330. In other words, as the virtual distance becomes greater the size of the caption 340 may become smaller. The importance of the of the conversation may affect how fast the caption 340 becomes smaller as the virtual distance becomes greater.

Figure 4:
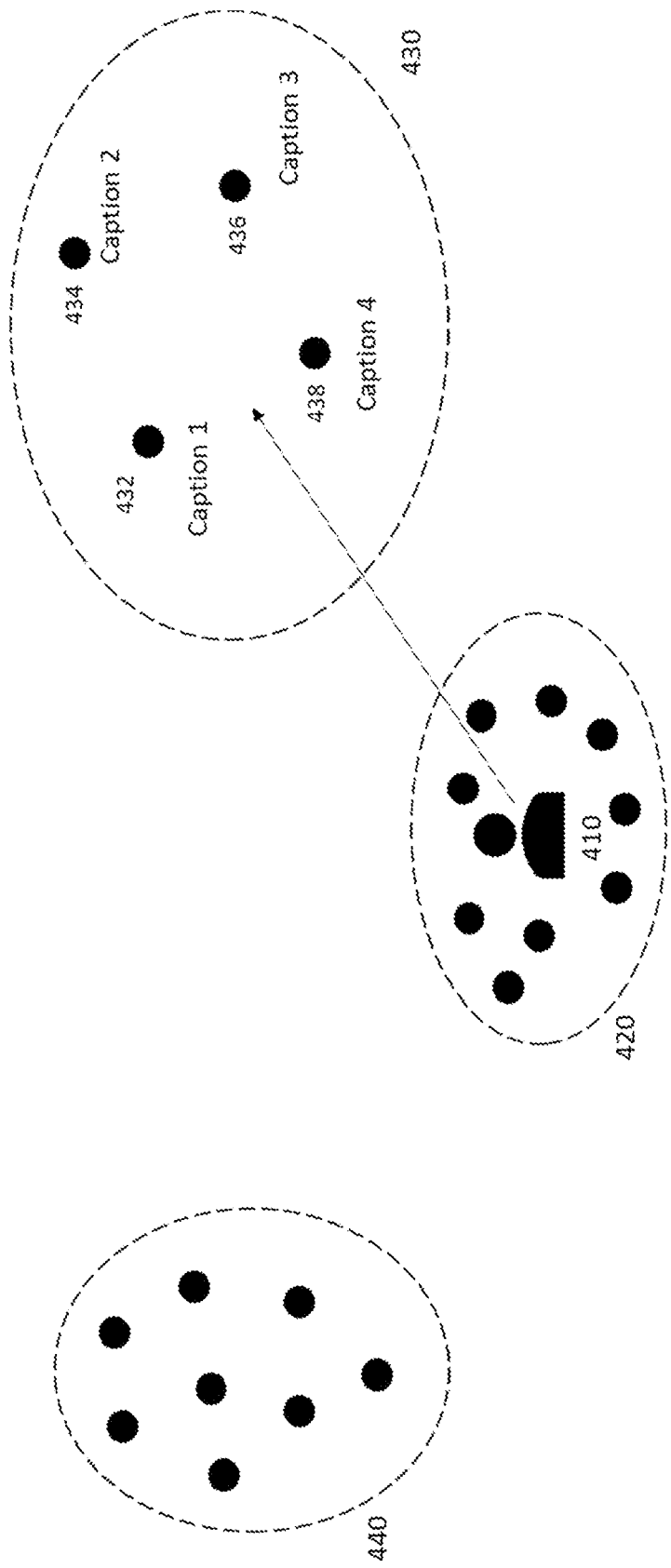
FIG. 4 illustrates an example embodiment of rendering captions for a virtual reality scene.

A virtual reality scene may be so large that it is not rendered completely to the user but only a subset of the virtual reality scene, a sub-scene, is rendered at a time. In some example embodiments, indications of other sub-scenes that are not currently completely rendered may be provided. In FIG. 4, the user 410 is immersed in a sub-scene 420. The sub-scene 420 is a subset of a virtual reality scene that comprises the sub-scenes 420, 430 and 440. As the virtual reality scene is too large to be rendered completely, sub-scenes of the virtual reality scene may be rendered individually. Therefore, a sub-scene may be understood as a portion of a virtual reality scene. In other words, the virtual reality content rendered to the user 410 comprises the sub-scene 420. The virtual reality scene of FIG. 4 comprises also the sub-scenes 430 and 440 although those are not rendered to the user 410 and thereby are not within the field of perception of the user 410.

If the user 410 decides to explore the virtual reality scene further by for example teleporting or zooming, the user 410 then expects to be rendered virtual reality content that is located in the part of the virtual reality scene the user 410 has explored to. In the example embodiment of FIG. 4, the user 410 teleports to the sub-scene 430. The visual virtual reality content comprising the sub-scene 420 is no longer rendered to the user 410 but instead, the visual virtual reality content comprising the sub-scene 430 is now rendered to the user 410. The audio virtual reality content associated with the sub-scene 420 is not rendered either after the user 410 has explored to the sub-scene 430. One or more captions relating to the audio virtual reality content within the sub-scene 420 may be rendered to the user 410 if it is determined that the level of interest is high enough and on the other hand, the virtual distance is not too great. A threshold may be set to the virtual distance such that a virtual distance greater than the threshold value causes the captions not to be rendered even though the user's level of interest would be above a threshold value for rendering the captions even after the virtual reality content related to the caption is no longer rendered. In this example embodiment, the virtual distance between the sub-scene 420 and the sub-scene 430 is above the threshold value and therefore once the user 410 has explored to the sub-scene 430, the captions associated with the virtual reality content of the sub-scene 420 are no longer rendered.

After the user 410 has explored to the sub-scene 430, the visual virtual reality content of the sub-scene 430 is rendered to the user 410. However, audio virtual reality content of the sub-scene 430 is not rendered to the user 410 in this example embodiment. This may be advantageous if the audio virtual reality content associated with the sub-scene 430 is to be fetched from a server over a network connection and/or it is to be determined which content to render to the user 410 based on the position of the user 410 within the sub-scene 430 for example. In order to save resources captions associated with the audio virtual reality content of the sub-scene 430 may be rendered instead. In the FIG. 4, virtual reality object 432 is associated with caption 1, virtual reality objects 434 is associated with caption 2, virtual reality object 436 is associated with caption 3 and virtual reality object 438 is associated with caption 4. If the user 410 provides input indicating that the audio virtual reality content associated with a caption is to be rendered, then the audio relating to the caption is fetched, if needed, and rendered. The user indication may be in any suitable form such as voice command, gesture or a click provided by the user 410.

Figure 5:
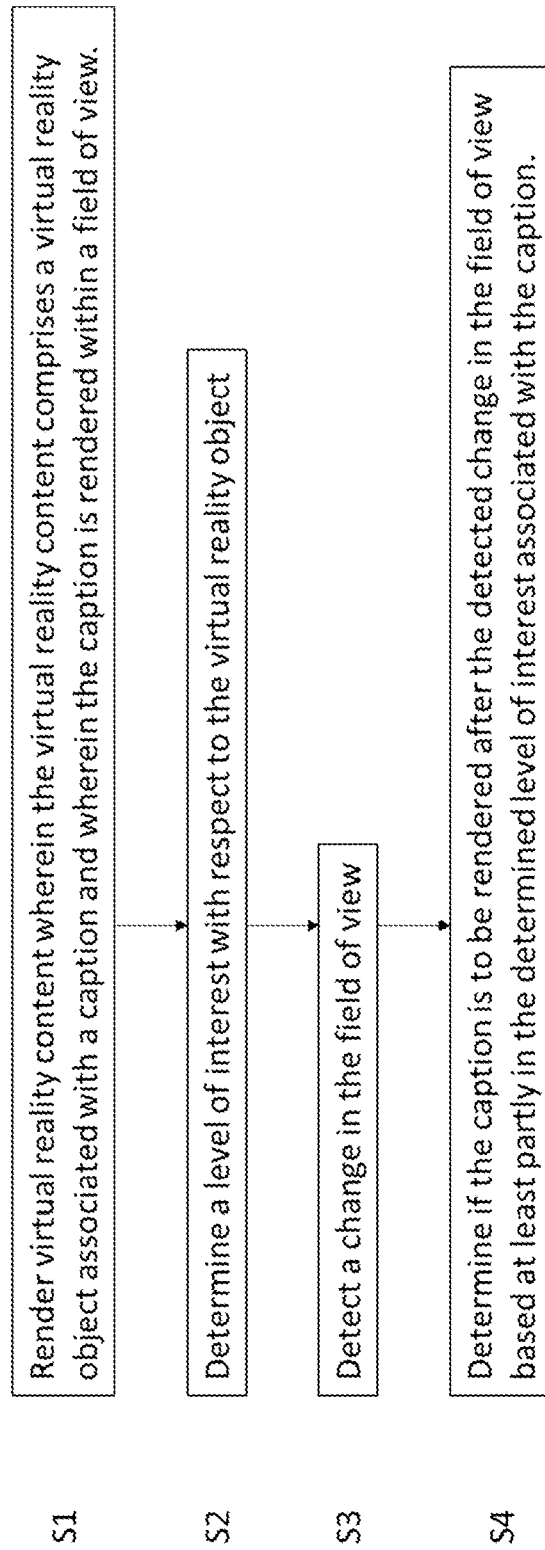
FIG. 5 illustrates a flow chart according to an example embodiment.

FIG. 5 illustrates a flow chart according to an example embodiment. Step S1 comprises rendering virtual reality content wherein the virtual reality content comprises a virtual reality object associated with a caption and wherein the caption is rendered within a field of view. Step S2 comprises determining a level of interest with respect to the virtual reality object. Step S3 comprises detecting a change in the field of view and step S4 comprises determining if the caption is to be rendered after the detected change in the field of view based at least partly in the determined level of interest associated with the caption.

Figure 6:
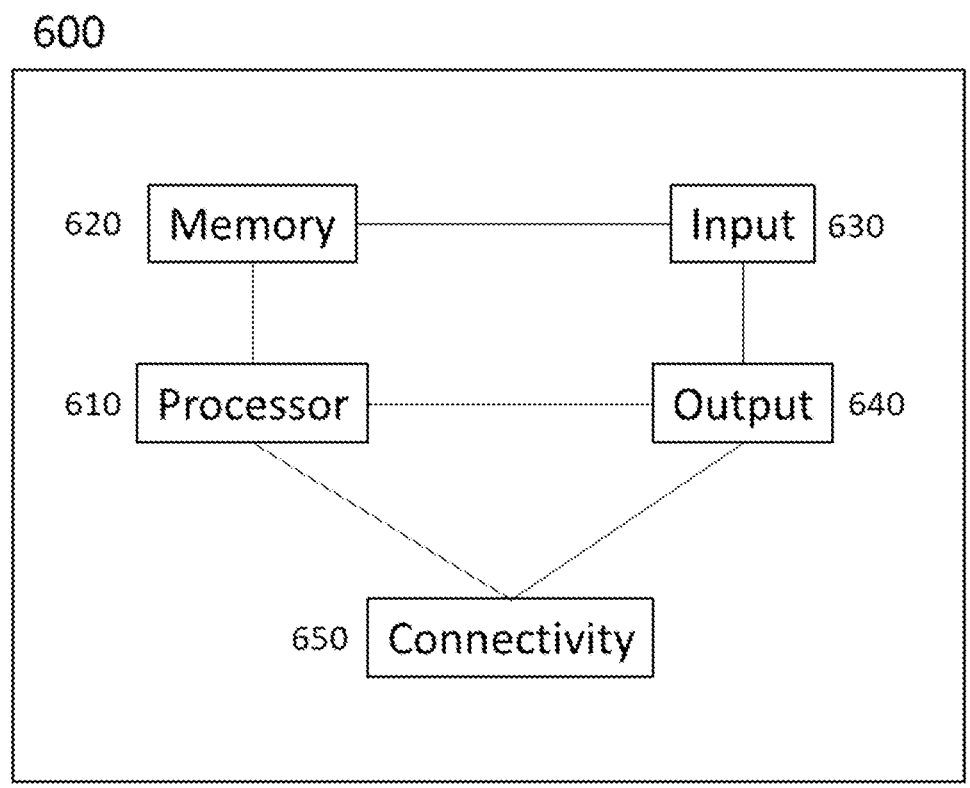
FIG. 6 illustrates an example embodiment of an apparatus.

FIG. 6 illustrates an apparatus 600, which may be a computing apparatus, according to an example embodiment. The apparatus 600 may be for example a headset, or comprised in a headset, configured to render virtual reality or, alternatively, configured to render augmented reality content. The apparatus 600 comprises a processor 610. The processor 610 interprets computer program instructions and process data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit comprises or is connected to one or more displays capable of rendering visual content such as a light emitting diode, LED, display, a liquid crystal display, LCD and a liquid crystal on silicon, LCoS, display. The output unit 640 may comprise two displays to render stereoscopic visual content. One display to render content to the left eye and the other display to render content to the right eye. The output unit 640 may further comprise a transmission unit, such as one or more waveguides or one or more lenses, to transfer the rendered visual content to the user's field of view. The output unit 640 further comprises one or more audio outputs. The one or more audio outputs may be for example loudspeakers or a set of headphones.

The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

Example embodiments described herein may be implemented using software, hardware, application logic or a combination of them. Also, if desired, different functionalities discussed herein may be performed in a different order, some functionalities may be performed concurrently, and, if desired, some of the above-mentioned functionalities may be combined. Although various aspects of the invention are set out in the independent claims, other aspects of the invention comprise other combinations of features from the described embodiments and/or dependent claims with features of the independent claims and not solely the combinations explicitly set out in the claims.

If desired, the different functions discussed herein may be performed in a different order and/or concurrently with each other. Furthermore, if desired, one or more of the above-described functions may be optional or may be combined. Similarly, it will also be appreciated that the flow chart of FIG. 5 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:
   at least one processor; and
   at least one memory including computer program code,
   the at least one memory and the computer program code configured to, with the at least one processor, cause the apparatus to perform at least the following:
   cause rendering of virtual reality content, wherein the virtual reality content comprises a virtual reality object associated with a caption and wherein the caption is rendered within a field of view of a user;
   determine a level of interest with respect to the virtual reality object;
   determine if the caption is to be rendered based at least partly on the determined level of interest associated with the virtual reality object;
   detect a change in the field of view of the user such that the virtual reality object is outside the field of view;

determine whether the caption is to be rendered after the detected change based, at least partly, on the determined level of interest associated with the virtual reality object; and in an instance the caption is to be rendered after the detected change, cause rendering of the caption at least one of in a position indicative of a direction of the virtual reality object, or with a visual indicator of the direction of the virtual reality object.

2. The apparatus according to claim 1, wherein the caption comprises textual content related to the virtual reality object the caption is associated with.

3. The apparatus according to claim 2, wherein the textual content is determined using speech recognition and automatic translation.

4. The apparatus according to claim 1, wherein determining the level of interest with respect to the virtual reality object comprises at least one of: detecting gaze of the user, detecting orientation of the user's head, detecting what the user is listening to or receiving user input indicative of interest with respect to the object.

5. The apparatus according to claim 1, wherein detecting the change in the field of view comprises at least one of detecting movement of a user, or a part of the user, or receiving an input that is determined to represent movement of the user.

6. The apparatus according to claim 5, wherein the determining if the caption is to be displayed after the detected change in the field of view is further based on a virtual distance between virtual reality object and the user after the movement.

7. A method comprising
causing rendering of virtual reality content, wherein the virtual reality content comprises a virtual reality object associated with a caption and wherein the caption is rendered within a field of view of a user;
determining a level of interest with respect to the virtual reality object;
determining if the caption is to be rendered after based at least partly on the determined level of interest associated with the virtual reality object;
detecting a change in the field of view of the user such that the virtual reality object is outside the field of view;
determining whether the caption is to be rendered after the detected change based, at least partly, on the determined level of interest associated with the virtual reality object; and
in an instance the caption is to be rendered after the detected change, causing rendering of the caption at least one of in a position indicative of a direction of the virtual reality object, or with a visual indicator of the direction of the virtual reality object.

8. The method according to claim 7, wherein the caption comprises textual content related to the virtual reality object the caption is associated with.

9. The method according to claim 8, wherein the textual content is determined using speech recognition and automatic translation.

10. The method according to claim 7, wherein determining the level of interest with respect to the virtual reality object comprises at least one of: detecting gaze of the user, detecting orientation of the user's head, detecting what the user is listening to or receiving user input indicative of interest with respect to the object.

11. The method according to claim 7, wherein detecting the change in the field of view comprises at least one of detecting movement of a user, or a part of the user, or receiving an input that is determined to represent movement of the user.

12. The method according to claim 11, wherein the determining if the caption is to be displayed after the detected change in the field of view is further based on a virtual distance between virtual reality object and the user after the movement.

13. A non-transitory computer readable medium comprising program instructions stored thereon for performing at least the following:
cause rendering of virtual reality content, wherein the virtual reality content comprises a virtual reality object associated with a caption and wherein the caption is rendered within a field of view of a user;
determine a level of interest with respect to the virtual reality object;
determine if the caption is to be rendered based at least partly on the determined level of interest associated with the virtual reality object;
detect a change in the field of view of the user such that the virtual reality object is outside the field of view;
determine whether the caption is to be rendered after the detected change based, at least partly, on the determined level of interest associated with the virtual reality object; and
in an instance the caption is to be rendered after the detected change, cause rendering of the caption at least one of in a position indicative of a direction of the virtual reality object, or with a visual indicator of the direction of the virtual reality object.

14. The non-transitory computer readable medium according to claim 13, wherein the caption comprises textual content related to the virtual reality object the caption is associated with.

15. The non-transitory computer readable medium according to claim 14, wherein the textual content is determined using speech recognition and automatic translation.

16. The non-transitory computer readable medium according to claim 13, wherein determining the level of interest with respect to the virtual reality object comprises at least one of: detecting gaze of the user, detecting orientation of the user's head, detecting what the user is listening to or receiving user input indicative of interest with respect to the object.

17. The non-transitory computer readable medium according to claim 13, wherein detecting the change in the field of view comprises at least one of detecting movement of a user, or a part of the user, or receiving an input that is determined to represent movement of the user.

* * * * *